United States Patent [19]

Ladwig

[11] 4,222,984

[45] Sep. 16, 1980

[54] METHOD OF WALLBOARD MANUFACTURE

[75] Inventor: Richard D. Ladwig, Salina, Kans.

[73] Assignee: Combustion Engineering, Inc., Windsor, Conn.

[21] Appl. No.: 955,820

[22] Filed: Oct. 30, 1978

[51] Int. Cl.² .................. B29D 27/04; B29H 7/20
[52] U.S. Cl. .................. 264/261; 106/110; 106/111; 264/86; 264/333
[58] Field of Search ............ 264/261, 333, 86; 106/109, 110, 111; 156/39, 45

[56] References Cited

U.S. PATENT DOCUMENTS

| | | | |
|---|---|---|---|
| 3,117,882 | 1/1964 | Herschler et al. | 106/111 |
| 3,189,511 | 6/1965 | White | 106/109 |
| 3,376,147 | 4/1968 | Dean | 106/109 |
| 3,957,522 | 5/1976 | Matsuo | 264/333 |
| 4,059,456 | 11/1977 | DeRooy et. al. | 106/111 |

Primary Examiner—Donald J. Arnold
Attorney, Agent, or Firm—Arthur L. Wade

[57] ABSTRACT

To calcium lignin sulfonate is added a formulation of ammonium or sodium linear alcohol ether sulfate in a ratio to form an additive to calcined gypsum slurry which will reduce the water requirement and the heat needed to cure the wallboard made from the slurry.

4 Claims, 3 Drawing Figures

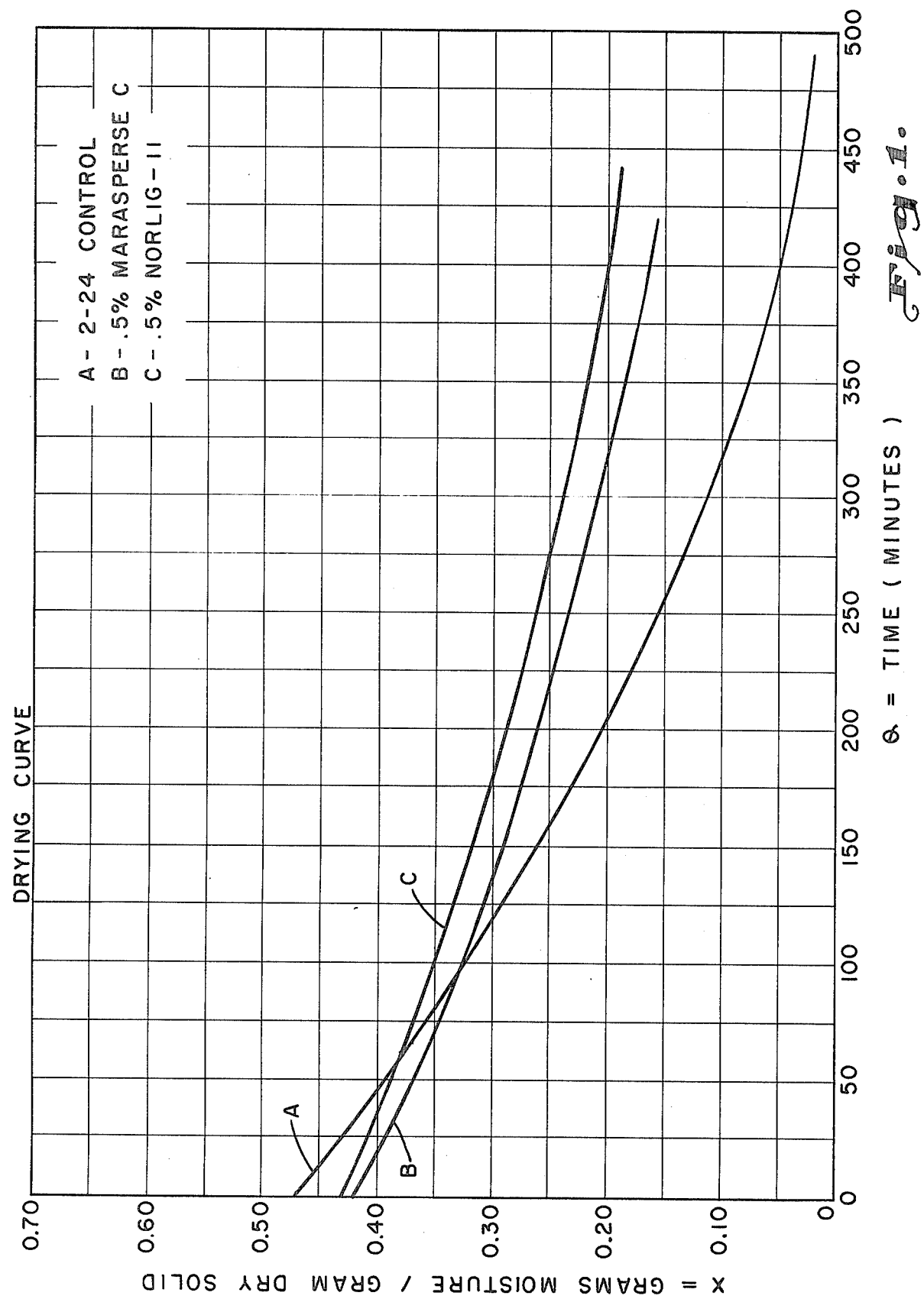

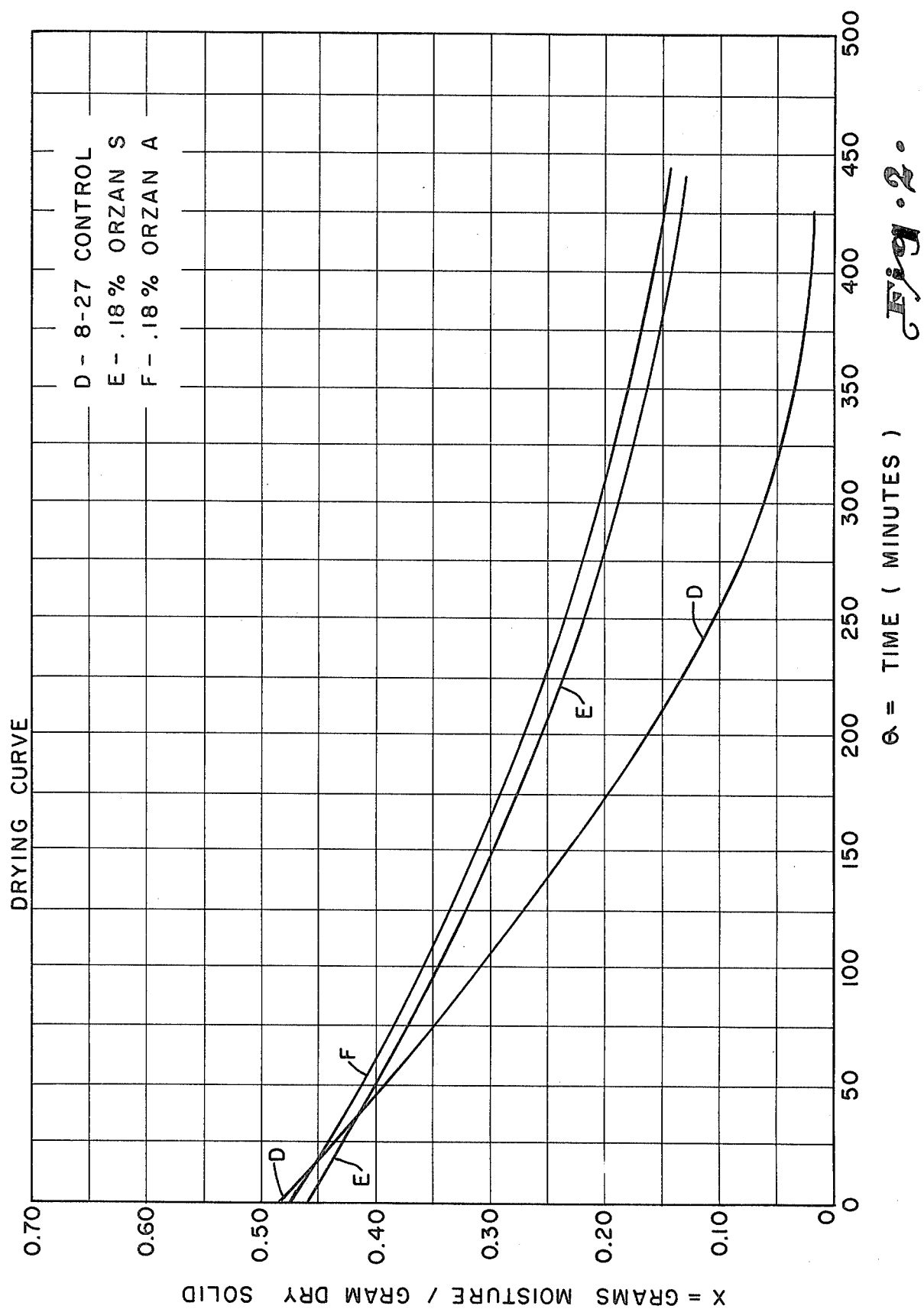

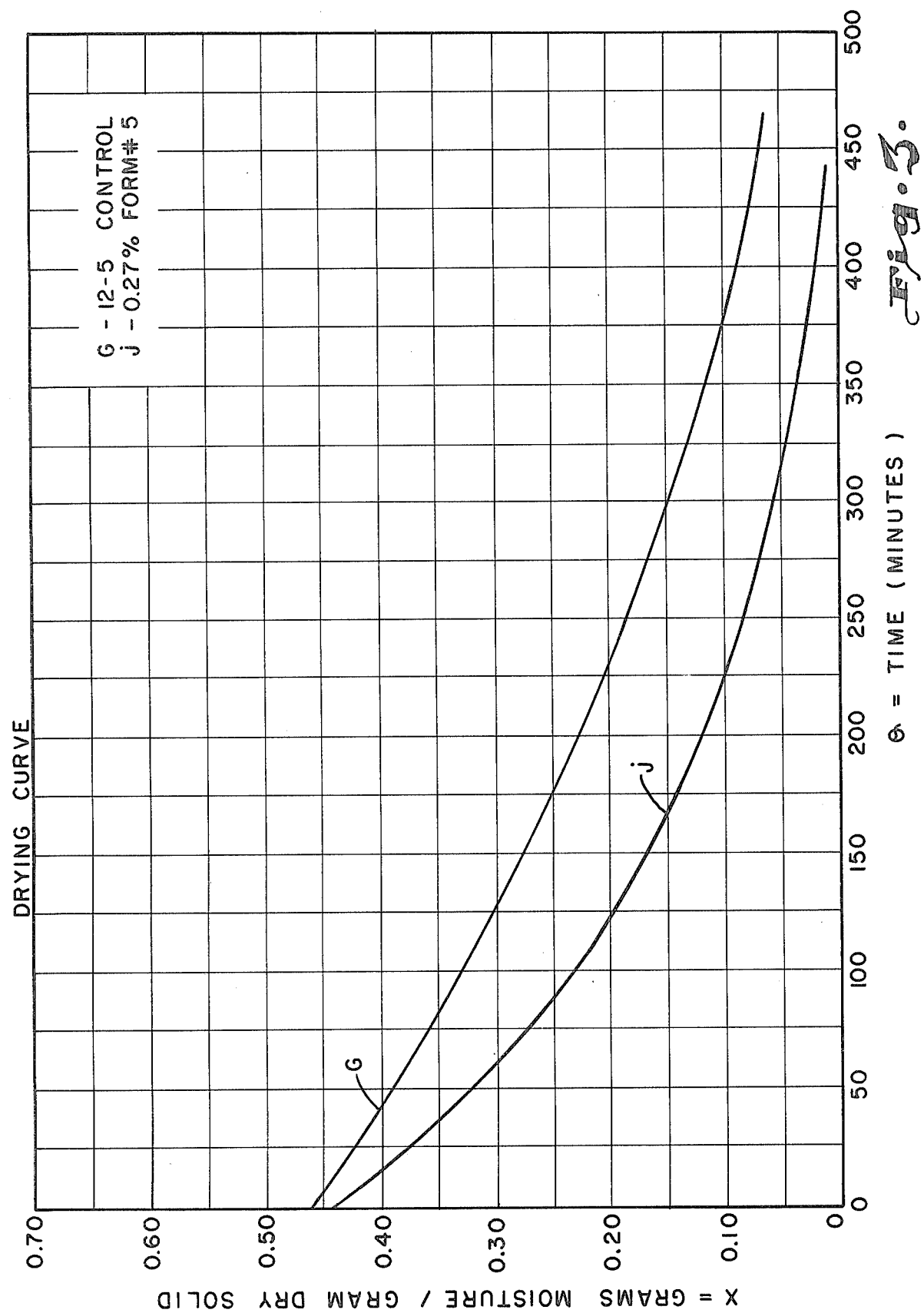

METHOD OF WALLBOARD MANUFACTURE

BACKGROUND OF THE INVENTION

1. Field of the Invention

This invention relates to the addition of a dispersant formulation which will effectively utilize water in gypsum wallboard manufacture to the end that the water quantity required in forming the slurry is reduced.

This invention also relates to the addition of a dispersant formulation which increases the diffusion rate of water from the wallboard during drying and, therefore, reduces the quantity of heat required to dry the wallboard.

This invention further relates to a process of adding a dispersant formulation to the slurry in wallboard manufacture which will reduce the quantities of water and drying heat required without sacrifice of the strength and flexibility of the product.

2. The Prior Art

There are several materials added for different purposes to gypsum stucco during the mixing of the slurry which is fed into the wallboard manufacturing process.

Starch, dispersant, accelerator, foam and water are some of the materials fed into the mixer with the stucco in order to make up the slurry for the wallboard formation. Other special materials are added where fire resistance and other characteristics are required of the wallboard. How these ingredients are added to the mixture is not of present concern.

What is important is that each ingredient has its own particular contribution to the mixture from which the final wallboard product is formed. For example, the starch is used to protect the gypsum crystals that form the bond with the paper. These crystals, being at the edges of the wallboard, are subject to dehydration during the period at high temperatures in the drying klins. If dehydration occurs, the paper will peel off the board core. The starch holds water during klin drying and protects these bonding crystals from severe dehydration. The accelerator is used as the catalyst to control the time that is desired to "set" the board on the production line. The production supervisor uses the minimum quantity of accelerator which gives him the hardening rate needed for the speed and equipment that makes up his production line. Too much accelerator can cause a weakened board core.

The dispersants are used to reduce the water carrying capacity of the stucco slurry. They also reduce surface tension and allow the slurry to flow with less frictional resistance. Foam is added in order to give about 25% by volume of soap bubbles to the slurry. This provides the board with the lighter weight necessary for easy handling, allows the board to be nailed without cracking or breaking, and gives some flexibility to the wallboard. Pulped paper is added to furnish a web of fibers to help hold the crystalline core together and also add flexibility to the finished product. Fiberglass has the same purpose in the fire rated wallboard products. Water is needed to make a slurry out of all the ingredients so that they will form a homogeneous mixture. The water also furnishes one ingredient needed for the reaction of stucco with water to make the gypsum wallboard. Therefore, water carries the ingredients and furnishes the medium in which the wallboard forming takes place. The ratio of water to stucco is usually 9 to 10. The slurry is discharged from the mixture onto a continuously moving paper covered line. This line normally runs at a speed of about 125 to 150 feet per minute. The paper is formed into an envelope which holds the stucco slurry until it has a chance to react and bond itself intimately to the paper. It then hardens, or sets, and then it can be cut and mechanically positioned for drying. Upon completion of the drying process, the board is bundled, taped and stacked for shipment. Due to the greater need for energy efficiency in manyfacturing processes, it is becoming important to cut down on the water required to manufacture gypsum wallboard, and thus, cut down on the energy required to dry the finished product.

Usually, 75% of the water added during forming must be evaporated out of the board during drying (about 1 pound per square foot of wallboard). This drying time is usually 45 to 60 minutes and requires 2 to 2.5 million BTU per one thousand square feet of regular ½ inch thick wallboard.

In order to make the process more efficient, it has become necessary to modify some of the standard additives. For example, reformulation of the dispersant is required in order to make it stronger acting so that the amount of water required may be reduced, while overcoming the properties causing soft, crumbly board and lengthened setting and drying time.

SUMMARY OF THE INVENTION

The present invention comtemplates an additive formulation of calcium lignin sulfonate and ammonium or sodium linear alcohol ether sulfate in a ratio of 2.0 to 1.0 for a gypsum slurry which causes a reduction in the water required for the slurry formulation and the heat required to form the wallboard product.

The invention further comtemplates that the additive formulation will be quantitatively included in the slurry in a range of 0.5 to 10.0 pounds per thousand square feet of one-half inch wallboard, depending on the results required in water and heat reduction and resulting board properties.

Other objects, advantages and features of the invention will become apparent to one skilled in the art upon consideration of the written specification, appended claims, and accompanying drawings.

BRIEF DESCRIPTION OF THE DRAWINGS

FIG. 1 is a graph of the drying rates of a control stucco in comparison with two other stuccos to which have been added lignin sulfonates of specific manufacturing origin;

FIG. 2 is a graph of a second control stucco in comparison with two other stuccos to which have been added lignin sulfonates of other specific manufacturing origins; and FIG. 3 is a graph of the drying rates of a third control stucco in comparison with a stucco to which has been added the formulation of the present invention.

DESCRIPTION OF THE PREFERRED EMBODIMENT

Most dispersants presently used by the industry are by-products from the pulp digesting process, wherein the lignin is dissolved from the wood chips allowing wood figers to separate. The lignin is dissolved by sulfonic acid and the lignin sulfonate by-product is separated, recovered and sold to many industries as a dispersant. These lignin sulfonate by-products contain other chemicals from the pulping process, especially fairly large amounts of wood sugars and smaller amounts of soluble chemicals. In most tests made, the lignin sulfonates, especially the sodium salts, were harmful to the quality of the finished gypsum test specimens. They are especially not desirable to use in large amounts because of the possibility of humidified splits occurring after the wallboard is shipped.

A purpose of the present invention was to develop an economical dispersant formulation which would not have the deleterious effect on wallboard quality that the lignins showed at higher use levels. Another purpose of this invention was to develop a dispersant, which would increase the diffusion rate of water vapor from the wallboard during the oven drying process, and thereby increase fuel efficiency.

The dispersant formulation developed as meeting the qualification is the 2.0 to 1.0 mixture of calcium lignin sulfonate to ammonium or sodium linear alcohol ether sulfate. These chemicals can all be classed as anionic surface active agents (surfactants). The chemistry of the calcium sulfate hemihydrate and water system shows (to those experienced in the art) that this class of chemicals should have effective dispersing properties.

Initial test work was carried out on coarse, neat stucco. This was done in order to determine the gross effects and to find the effective dispersants more easily, due to the greater dispersion characteristics of coarse, neat stucco.

The final test work was carried out using a finely ground "reground aridized stucco". This was chosen because it was the most difficult to disperse with the added ingredient of soluble calcium chloride and the finely ground nature of the stucco.

The final analysis showed that a combination of calcium lignin sulfonate and synthetic surfactant would do the most efficient dispersing. Each formulation investigated had to show excellent paper bonding properties, and no adverse effects on strength. The final discovery was that ammonium or sodium linear alcohol ether sulfate, in combination with calcium lignin sulfonate, significantly reduced the drying time in comparison to all prior art formulations. The resulting dispersant formulation showed the ability to maintain excellent wallboard properties when used in concentrations high enough to obtain the desired results in conjunction with enhanced diffusion. The economics showed the cost to be presently greater than the lignin sulfonates commonly used, but acceptable, due to increasing energy costs. The deleterious effects of the lignin dispersants had been overcome.

In disclosing the present invention, the inadequacies of a range of other lignin sulfonate formulations to produce desired drying rates will be illustrated for comparison with the formulations of the present invention. Suppliers of various lignin sulfonates presently recommend their product alone as effective in reducing the quantity of water required for gypsum slurry formulation and, consequently, in reducing the quantities of heat required to produce the final product. To illustrate the shortfall of representative lignin sulfonates, FIGS. 1 and 2 are presented in summation of extensive investigation.

All well-known lignin sulfonate dispersants currently accepted in the market were tested with control stuccos to calibrate the results of water quantity reduction and drying rate.

FIG. 1 graphs the drying rate of a first control stucco with well-known Marasperse C-21, a calcium and sodium lignin sulfonate (highly purified), and Norlig 11, a calcium lignin sulfonate; both products marketed by American Can Company, American Lane, Greenwich, Connecticut. Both of those lignin sulfonate variations were added at 0.5% by weight to their respective slurries. This was the highest usage rate found. At this rate, significant deterioration of strength began.

These dispersants do show a significant reduction in water requirement, 7.8% for the Marasperse C-21 and 5.2% for the Norlig 11, but the curves clearly show a significantly increased drying time in comparison with the control stucco. Therefore, there is an actual increase in the amount of heat needed to dry the wallboard.

FIG. 2 discloses a second control stucco in comparison with stuccos to which a second pair of lignin sulfonates alone has been added. Specifically, Orzan S, a sodium lignin sulfonate, and Orzan A, an ammonium lignin sulfonate, both marketed by Crown Zellerbach Corporation, Chemical Products Division, Camas, Washington, were added in the weight ratio of 0.18% to their respective slurries. Although both lignin sulfonates allowed a water reduction of 3.8%, both required a greater drying time than the control. The 0.18% w/w level was the most effective level found for only lignin sulfonate use. At this level (2.5 pounds per thousand square feet of one-half inch wallboard), the properties were good except, of course, the longer drying time and, therefore, larger quantity of heat required.

FIG. 3 graphically discloses the results of adding a specific formulation of stucco within the inventive concept. Plot G represents the drying time of control stucco without the inventive formulation. Plot J represents the drying time of a mixture with 0.27% of the formulation of calcium lignin sulfonate and ammonium or sodium linear alcohol ether sulfate. The formulation represented by Plot J is the best mode of practicing the invention with ammonium or sodium linear alcohol ether sulfate in combination with calcium lignin sulfonate.

More specifically, Plot J represents the drying time for a slurry with an additive formulation made up of 2 parts of calcium lignin sulfonate and 1 part of an ammonium or sodium linear alcohol ether sulfate. Further, quantitatively, the new formulation added to the slurry was within a range of ratios including 0.5 to 10.0 pounds of the formulation to one thousand square feet of one-half inch wallboard. The formulation represented by Plot J was selected from extensive laboratory data. Plot J clearly demonstrates, to those skilled in the art, a 4% decrease in water requirement to formulate the stucco slurry and, more importantly, results in a 40% decrease in drying time.

In the extensive laboratory experiments carried out to determine the formulations which would reduce the amount of water required to form a slurry and cause a corresponding dramatic reduction in the amount of heat required to cure the wallboard, there appeared no difference of significance between those formulations utilizing ammonium linear alcohol ether sulfate and those using sodium linear alcohol ether sulfate. Quantitatively, either of the surfactants would achieve the results of water and heat reduction if combined with calcium lignin sulfonate in a ratio falling within the range of 1:1 to 3:1 of calcium lignin sulfonate to the surfactant. However, the preferred embodiment, as represented by Plot J, was formed with a ratio of 2:1.

From the foregoing, it will be seen that this invention is one well adapted to attain all of the ends and objects hereinbefore set forth, together with other advantages which are obvious and inherent to the method.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A process for making wallboard, including,
   calcining gypsum with which to form a slurry,
   mixing with the calcined gypsum a formulation of a calcium lignin sulfonate and ammonium linear alcohol ether sulfate, which formulation is in a ratio, whose range includes 1:1 to 3:1 by weight,
   adding water to form a slurry of the mixture,
   sandwiching the slurry in a paper envelope to form the wallboard,
   and heating the wallboard to drive off enough water to give the wallboard its final desired hardness and strength.

2. A process for making wallboard, including,
   calcining gypsum with which to form a slurry,
   mixing with the calcined gypsum a formulation of a calcium lignin sulfonate and sodium linear alcohol ether sulfate, which formulation is in a ratio, whose range includes 1:1 to 3:1 by weight,
   adding water to form a slurry of the mixture,
   sandwiching the slurry in a paper envelope to form the wallboard,
   and heating the wallboard to drive off enough water to give the wallboard its final desired hardness and strength.

3. The process of claim 1 wherein,
   the formulation of calcium lignin sulfonate and the ammonium linear alcohol ether sulfate is added to the calcined gypsum in a ratio whose range includes 0.5 to 10.0 pounds of the formulation to one thousand square feet of one-half inch wallboard.

4. The process of claim 2 wherein,
   the formulation of calcium lignin sulfonate and the sodium linear alcohol ether sulfate is added to the calcined gypsum in a ratio whose range includes 0.5 to 10.0 pounds of the formulation to one thousand square feet of one-half inch wallboard.

* * * * *